US010670705B2

(12) United States Patent
Malinovskiy

(10) Patent No.: US 10,670,705 B2
(45) Date of Patent: Jun. 2, 2020

(54) METHOD FOR AVOIDING PHASE JUMPS

(71) Applicant: Endress + Hauser GmbH + Co. KG, Maulburg (DE)

(72) Inventor: Alexey Malinovskiy, Maulburg (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 449 days.

(21) Appl. No.: 15/506,784

(22) PCT Filed: Jul. 16, 2015

(86) PCT No.: PCT/EP2015/066271
§ 371 (c)(1),
(2) Date: Feb. 27, 2017

(87) PCT Pub. No.: WO2016/030077
PCT Pub. Date: Mar. 3, 2016

(65) Prior Publication Data
US 2017/0254891 A1    Sep. 7, 2017

(30) Foreign Application Priority Data

Aug. 26, 2014  (DE) .................. 10 2014 112 228

(51) Int. Cl.
*G01S 13/34* (2006.01)
*G01S 7/35* (2006.01)
(Continued)

(52) U.S. Cl.
CPC ............ *G01S 13/34* (2013.01); *G01F 23/284* (2013.01); *G01S 7/023* (2013.01); *G01S 7/352* (2013.01);
(Continued)

(58) Field of Classification Search
CPC .... G01F 23/284; G01F 1/663; G01F 23/0069; G01F 23/2928; G01F 23/2962;
(Continued)

(56) References Cited

U.S. PATENT DOCUMENTS 4,383,443 A    5/1983  Langdon
4,847,623 A *  7/1989  Jean ...................... G01F 23/284
                                                 342/124

(Continued)

FOREIGN PATENT DOCUMENTS

DE        19961855 A1    6/2001
DE     102014112228 A1    3/2016
(Continued)

OTHER PUBLICATIONS

Proceedings of the 8th European Radar Conference; Serdal Ayhan; Mario Pauli; Thorsten Kayser; Steffen Scherr; Thomas Zwick; FMCW Radar System with Additional Phase Evaluation for High Accuracy Range Detection; Karlsruhe Institute of Technology (KIT); pp. 117-121; dated Oct. 12-14, 2011.

(Continued)

*Primary Examiner* — Olumide Ajibade Akonai
(74) *Attorney, Agent, or Firm* — Bacon & Thomas, PLLC

(57) ABSTRACT

A method for processing a measurement signal that is captured by a measuring device, wherein, in order to capture the measurement signal, the measuring device emits a transmission signal and receives a component of the transmission signal that is reflected by an object as a reception signal, wherein a first phase difference between a first target phase position and a first actual phase position contained in the measurement signal is determined, and wherein a second phase difference between a second target phase position and a second actual phase position contained in the measurement signal is determined, and a phase difference progression in (Continued)

the form of an, in particular, linear, functional relationship is determined on the basis of the first and the second phase differences, and a measured value is determined by means of the functional relationship.

10 Claims, 3 Drawing Sheets

(51) Int. Cl.
    *G01S 7/40*         (2006.01)
    *G01F 23/284*     (2006.01)
    *G01S 7/02*         (2006.01)
    *G01S 13/88*       (2006.01)

(52) U.S. Cl.
    CPC ................ *G01S 7/40* (2013.01); *G01S 13/88* (2013.01); *G01S 2007/356* (2013.01)

(58) Field of Classification Search
    CPC .......... G01S 13/88; G01S 13/38; G01S 13/32; G01S 13/08; G01S 13/34; G01S 7/354; G01S 13/42; G01S 13/931; G01S 7/292; G01S 13/524; G01S 13/70; G01S 13/726; G01S 7/412; G01S 7/415; H01Q 1/225
    See application file for complete search history.

(56) References Cited

U.S. PATENT DOCUMENTS

| | | | | |
|---|---|---|---|---|
| 6,107,957 A * | 8/2000 | Cramer | ................ | G01F 23/284 342/124 |
| 6,157,339 A * | 12/2000 | Sato | ........................ | G01S 7/292 342/107 |
| 2006/0023571 A1 * | 2/2006 | Uebo | ..................... | G01S 13/32 367/101 |
| 2007/0165488 A1 | 7/2007 | Wildey | | |
| 2009/0235736 A1 * | 9/2009 | Spanke | ................. | G01F 23/284 73/290 V |
| 2010/0070207 A1 * | 3/2010 | Sai | ......... | G01F 23/284 702/55 |
| 2011/0166805 A1 * | 7/2011 | Hammer | ............... | G01F 23/284 702/55 |
| 2011/0285577 A1 * | 11/2011 | Sun | ......................... | G01S 13/36 342/123 |
| 2013/0063298 A1 * | 3/2013 | Gorenflo | ............... | G01F 23/284 342/124 |
| 2014/0253366 A1 * | 9/2014 | Kleman | ................. | G01F 23/284 342/124 |
| 2014/0360264 A1 * | 12/2014 | Vogel | .................... | G01F 23/284 73/290 V |

FOREIGN PATENT DOCUMENTS

| | | |
|---|---|---|
| EP | 0955528 A1 | 11/1999 |
| EP | 1707982 A1 | 10/2006 |
| WO | WO2012117261 A1 | 9/2012 |

OTHER PUBLICATIONS

English Translation of the International Preliminary Report on Patentability, WIPO, Geneva, CH,—dated Mar. 9, 2017.
International Search Report, EPO, The Netherlands—dated Sep. 25, 2015.
German Search Report, German Patent Office, Munich, DE—dated Sep. 24, 2014.

* cited by examiner

METHOD FOR AVOIDING PHASE JUMPS

TECHNICAL FIELD

The invention relates to a method for processing a measurement signal that is captured by a measuring device, wherein, in order to capture the measurement signal, the measuring device emits a transmission signal and receives a component of the transmission signal that is reflected by an object as a reception signal. In particular, the invention relates to a method for avoiding so-called phase jumps in the evaluation of the measurement signal in a radar measuring device.

BACKGROUND DISCUSSION

A "measuring device" in the sense of this invention is not to be understood as a single device, but rather as a combination of a higher-level unit, such as a transmitter, and a consumer, such as a sensor. The sensor is connected by a cable to the transmitter and supplied with energy by the cable. Moreover, data are exchanged bi-directionally between the sensor and transmitter. Some of the tasks of the transmitter can be transferred to the sensor, i.e., one or more electronic switches such as a microcontroller are located within the sensor. Sensor-specific data such as a name, serial number, production date, device data, calibration data, firmware version, manufacturer information, device driver information, sensor data, history data, and process data can be saved in the microcontroller or in a memory of the sensor. The evaluation of the measured data of the sensor can also be divided between the transmitter and sensor. Furthermore, the addressed tasks can also be taken over by the cable, i.e., "intelligence" can also be located in the cable, such as in the form of a microcontroller that, for example, is located within a cable sheath of the cable. A measuring device supplies a measured value that, for example, corresponds to a distance.

Radar measuring devices that work with microwaves are used in numerous branches of industry, such as the chemical industry, the food industry, or the oil and gas industry. Typically, the fill level in a container needs to be measured. These containers normally have an opening in which a connecting piece or flange is provided for attaching radar measuring devices.

Radar measuring devices are designed to determine the distance of an object, such as the fill level in a container, by transmitting a transmission signal consisting of microwaves by means of a transmission unit to the surface of the object, and receiving as a reception signal the echo waves that are reflected from the surface. An echo function representing the echo amplitudes as a function of the distance is formed, from which a probable useful echo and its runtime are determined. The distance between the object's surface and the transmission unit is determined from the runtime.

With radar measuring devices, the measuring precision can be increased by taking into account an actual phase position at the echo peak of a useful echo function. An abrupt change of the measured value supplied from the processing of the measurement signal is calculated as the phase jump. In the context of the invention, the term "abrupt" is to be understood as a rate of change of a measured value that cannot correspond to a rate change of a spatial position of the surface of an object to be measured relative to the general framework provided by reality. A phase jump is accordingly an error in the evaluation of a measurement signal in which the measured value changes very quickly over time. Phase jumps can occur while processing phase information that is contained in the measurement signal.

Taking into account the actual phase position involves adding up the number of phase periods or wavelengths between the radar measuring device and the surface of the object, as well as the portion of the last phase period or wavelength determined by the actual phase position, in order to precisely calculate the overall measuring distance. A rough measuring distance is accordingly captured from runtime information contained in the intermediate frequency signal, in order to ascertain the number of phase periods between the radar measuring device and the last phase period. Then, a correction of the roughly captured measuring distance is carried out using the phase information contained in the intermediate frequency signal.

In radar measurements, interference signals or briefly occurring measuring conditions can arise that impair the precision in determining the measured distances from the runtime information. Furthermore, it can occur that a radar measuring device has a systematic error in processing the measurement signal. Such disturbances and/or systematic errors can cause the last phase period to be misidentified.

For example, a radar measuring device that serves to measure the level of a medium in a container is installed in a surge pipe. Dispersive effects arise, is in particular, in radar measuring devices that use an FMCW radar-measuring method. When measuring the fill level in a pipe, a frequency-modulated radar signal is coupled into the pipe in accordance with the principles of the FMCW radar. Since the frequency of the coupled-in FMCW radar signal varies, the propagation speed of the radar signal also varies. The different propagation speeds cause the reflected radar signal to blur and dissipate, which must be evaluated by the radar measuring device. This dependence of the propagation speed upon frequency is termed dispersion. The effects caused by the frequency-dependent propagation speed—in particular, the blurring and dissipation of the reflected signal—are termed dispersive effects.

The radar signal propagation speed also varies, depending upon the surge pipe geometry. If the surge pipe diameter is known, the dispersive effects can be taken into account when processing the measurement signal. Consequently, the surge pipe diameter is indicated when the radar measuring device is installed in a surge pipe. It can, however, happen that the indicated surge pipe diameter does not correspond to the actual surge pipe diameter. For example, a surge pipe can have a manufacturing defect such that the actual diameter deviates from the indicated diameter. Such defects can also occur at points in the surge pipe, so that the surge pipe diameter is not constant.

A radar measuring device that is calibrated for a first—in particular, specified—surge pipe diameter and is used in a surge pipe that has a second surge pipe diameter that, in particular, deviates from the first surge pipe diameter, and/or has a varying surge pipe diameter, assigns a systematic error in the processing of the measurement signal. Such errors cause the phase progression of the measurement signal that is ascertained or calculated beforehand to be incorrectly calculated. The phase progression calculated beforehand is termed a target phase progression, wherein a target phase position can be derived for each given distance or measuring distance from the target phase progression. In the event that the target phase progression is ascertained incorrectly, excessive measuring precision in determining the measured distance with runtime information cannot help prevent phase jumps.

If the target phase progression is ascertained incorrectly, or the measuring precision in determining the rough measured distance is insufficient, it can occur that the last phase period is incorrectly identified. In this case, correcting the determination of the measuring distance with phase information of the intermediate frequency signal can cause a jump in the ascertained measured distance of the corresponding measured value. This jump generally contributes about one-half a wavelength of the microwave signal. In the event that a phase period is incorrectly identified as the last phase period and deviates by more than one phase period from the actual last phase period, the measured values corresponding to an ascertained measured distance can also jump to an integral multiple of one-half a wavelength of the microwave signal. Stated more precisely, the jump in the measured value contributes precisely one integral multiple of one-half a wavelength, plus or minus a phase correction factor that is ascertained from the difference between the target phase position and actual phase position.

Conventionally, these jumps have been suppressed through referencing additional information. This additional information is, for example, an index correction table that is conceived for measuring the fill level in a container. An index correction table can be compiled while performing a complete filling and draining process. The jumps that arise in this controlled process can be taken into account or eliminated in measuring mode. A method of this type is described in the document, "FMCW Radar System with Additional Phase Evaluation for High Accuracy Range Detection" by Serdal et al. In this method, changes in a measured value with reference to the preceding measured values ascertained by signal evaluation are considered when evaluating the measurement signal. Abrupt changes in the measured values are then permitted or rejected. Changes arising from phase jumps can thereby be avoided.

Such solutions generally require not only a large memory capacity, but also only become effective after time-consuming procedures have been carried out, such as filling and draining procedures. In addition, the effort must be repeated, if the power fails or the radar measuring device is restarted.

SUMMARY OF THE INVENTION

The object of the invention is to propose a method for avoiding phase jumps when capturing a measured distance, as well as a measuring device that reliably supplies a precise measured value in measuring mode.

With regard to the method, the object is achieved by a method for processing a measurement signal that is captured by a measuring device, wherein, in order to capture the measurement signal, the measuring device emits a transmission signal and receives a component of the transmission signal that is reflected by an object as a reception signal, wherein a first phase difference between a first target phase position and a first actual phase position contained in the measurement signal is determined, and wherein a second phase difference between a second target phase position and a second actual phase position contained in the measurement signal is determined, and a phase difference progression in the form of an, in particular, linear, functional relationship is ascertained on the basis of the first and the second phase difference, and a measured value is determined by means of the functional relationship. It is assumed that the phase difference between the target phase position and the actual phase position is related to time and/or to a changing distance or measuring distance in a manner that can be approximated by means of a mathematical function. In particular, in situations in which the measuring device has a systematic error when creating a progression of the target phase position, i.e., a target phase progression, it is anticipated that the progression of the phase difference has a functional form.

The method is preferably used for determining the fill level. For example, the method can be carried out by means of a fill-level measuring device that has a measurement signal and/or measured value processing electronics.

The phase difference between the actual phase position and the target phase position can, for example, change linearly with the distance to the object. This is based upon the fact that the target phase progression as well as the actual phase progression are substantially linear over time and/or distance or measuring distance. Accordingly, the difference between the actual phase position and the target phase position is substantially linear. This progression is termed the phase difference progression.

The measuring device accordingly provides a stable measured value by means of the ascertained functional relationship that represents the phase difference progression. This is particularly advantageous in an industrial plant in which measuring devices are used for capturing process variables, in order to there prevent process variables from being influenced by actuators from a phase jump.

The stable measured value is reliably and concisely ascertained by measurement signal evaluation, which will be described below, in which the functional relationship is used to avoid phase jumps in the calculation of the measured value.

The most familiar examples that make it possible to measure distances by means of reflected measurement signals are for a radar measuring device that works with microwaves, especially a fill-level measuring device, the pulse radar, and the frequency modulation continuous wave radar (FMCW radar).

With the pulse radar, broadband microwave transmission pulses, in the following termed wave packets, are periodically sent and are reflected by the object's surface and received after a distance-dependent runtime. The received wave packets are generally converted by means of a superheterodyne receiver into an intermediate frequency signal. For this purpose, the wave packets are mixed with a pulse signal generated in the radar measuring device, in order to generate the intermediate frequency signal. The intermediate frequency signal is then scanned by means of a downstream A/D converter in order to digitize the intermediate frequency signal. An echo function can then be formed by deriving the received signal amplitude from the intermediate frequency signal and depicted as a function of time. Each value of this echo function corresponds to the amplitude of an echo wave reflected at a specific distance from the antenna.

In the FMCW method, a continuous microwave transmission signal is sent which is periodically frequency modulated linearly—for example, corresponding to a sawtooth function. In comparison to the momentary frequency that the microwave transmission signal has at the time of reception, the frequency of the received echo signal therefore has a frequency differential which depends upon the runtime of the echo signal. The frequency differential between the transmission signal and the reception signal, which can be obtained by mixing both signals to generate an intermediate frequency signal and by evaluating the Fourier spectrum of the intermediate frequency signal, accordingly corresponds to the distance of the reflected surface from the antenna. Moreover, the amplitudes of the spectral lines of the frequency spectrum obtained by Fourier transformation correspond to the echo amplitudes. This Fourier spectrum therefore represents the echo function in this case.

The actual phase position can be ascertained from the intermediate frequency data. In the ideal case, the phase progression of a transmitted microwave signal is known over the entire runtime of the microwave signal. The phase position of an echo peak, or the target phase position, to be expected can therefore be calculated using a runtime ascertained from the echo function. The phase position or the target phase position to be expected changes linearly with the measuring distance or runtime; as the measuring distance increases, the target phase position also increases. This applies to the target phase position within a phase period, wherein a phase period corresponds to a wavelength of the microwave transmission signal.

Accordingly, a measured distance corresponds to an integral number of phase periods or wavelengths of the microwave transmission signal and a specific portion of a last phase period or wavelength. The portion of the last phase period can be determined using the actual phase position.

A requirement for this is that the measuring precision of the rough determination of the measuring difference using the runtime information is sufficient for the actual last phase period to be clearly identifiable as the last phase period. Inter alia, this means that the determination of the measuring distance from the runtime information may have a measuring error that is at most one-half a wavelength of the measurement signal. It must be less than one-half a wavelength, since the measuring distance corresponds to one-half the travel path of the transmission/reception signal or the measurement signal. The measured distance captured from the runtime information may therefore differ from the actual measured distance up to plus or minus one-fourth of a wavelength.

When the last phase period in which the ascertained actual phase position of the echo peak of the useful echo is located is determined correctly, the measuring distance can be determined with high measuring precision by means of this ascertained actual phase position.

In an advantageous development of the method, the functional relationship is ascertained as a function of a distance of the object to be determined from the measurement signal. When the distance of an object changes, then the phase difference also generally changes. The phase difference progression can be approximated with a linear function. The phase difference progression can accordingly be ascertained by means of at least two determinations of the phase difference.

In an advantageous development of the method, the ascertained functional relationship is used to avoid a phase jump when determining the measured value.

In a development of the method, a parameter of the phase difference progression—in particular, a slope and/or an axial offset of the, in particular, linear functional relationship—is used to recognize and/or correct a phase jump of the measured value. If the phase difference changes abruptly, this change is reflected in the, in particular, linear functional relationship. Accordingly, a phase jump can be recognized with the aid of a parameter of the relationship. Moreover, a correction of the measured value can be made by means of the relationship, by calculating the measured value with the aid of the parameter. Alternatively, the measurement signal processing can be carried out such that the parameter of the, in particular, linear functional relationship that is adapted to the phase difference progression corresponds to the given criteria. The given criteria can, for example, be specified in the form of a value range.

In a development of the method for a radar measuring device, the received signal is converted into a digital measurement signal, particularly by means of a scanning method, and the distance of the object is determined with runtime information contained in this measurement signal, in order to ascertain the functional relationship.

In a development of the method, the functional relationship is ascertained with the assistance of a linear regression.

In a development of the method, the functional relationship is updated iteratively with additionally ascertained phase differences.

In a development of the method, the first phase difference is determined at a first distance of the object, wherein the first target phase position is calculated for this first distance, and wherein the first actual phase difference is ascertained at this first distance, and the second phase difference is determined at a second distance of the object, wherein the second target phase position is calculated for this second distance, and wherein the second actual phase position is ascertained at this second distance. For example, the first distance can correspond to a first fill level, and the second distance can correspond to a second fill level.

In a development of the method, the first target phase position and/or the second target phase position is ascertained with a target phase progression, the target phase progression is ascertained by means of a calibration of the measuring device, and the calibration is carried out with the aid of at least one known distance. The calibration can, for example, be carried out in a production plant in which the distance of an object to be determined, and possibly the diameter of a surge pipe, are known. The target phase progression as a result of calibration can be saved in a memory unit of the measuring device.

With regard to the measuring device, the aim is achieved by a measuring device that serves to capture and process a measurement signal, wherein the measuring device emits a transmission signal, and a component of the transmission signal reflected by an object is received as the reception signal, wherein the measuring device has an electronics unit, wherein the electronics unit serves to determine a first phase difference between a first target phase position and a first actual phase position contained in the measurement signal, and wherein the electronics unit serves to determine a second phase difference between a second target phase position and a second actual phase position contained in the measurement signal, and the electronics unit ascertains a phase difference progression in the form of an, in particular, linear functional relationship with the aid of the first and second phase differences, and the measuring device determines a measured value by means of the functional relationship. The electronics unit of the measuring device can, for example, be located in a transmitter in the measuring device. It is assumed that the phase difference between the target phase position and the actual phase position is related to time and/or to a changing distance or measuring distance in a manner that can be approximated by means of a mathematical function. Particularly in situations in which the measuring device has a systematic error when creating a progression of the target phase position, i.e., a target phase progression, it is anticipated that the progression of the phase difference has a functional form.

The phase difference between the actual phase position and the target phase position can, for example, change linearly with the distance to the object. This is based upon the fact that the target phase progression as well as the actual phase progression are substantially linear over time and/or distance or measuring distance. Accordingly, the difference between the actual phase position and the target phase position is substantially linear. This progression is termed the phase difference progression.

The measuring device provides a stable measured value by means of the ascertained functional relationship that represents the phase difference progression. This is particularly advantageous in an industrial plant in which measuring devices are used for capturing process variables, in order to there prevent process variables from being influenced by actuators from a phase jump. The stable measured value is reliably and concisely ascertained by the overall evaluation of the measurement signal.

BRIEF DESCRIPTION OF THE DRAWINGS

A preferred embodiment of the invention will be explained in more detail with reference to the following figures. Illustrated are.

DETAILED DISCUSSION IN CONJUNCTION WITH THE DRAWINGS

Figure 1:
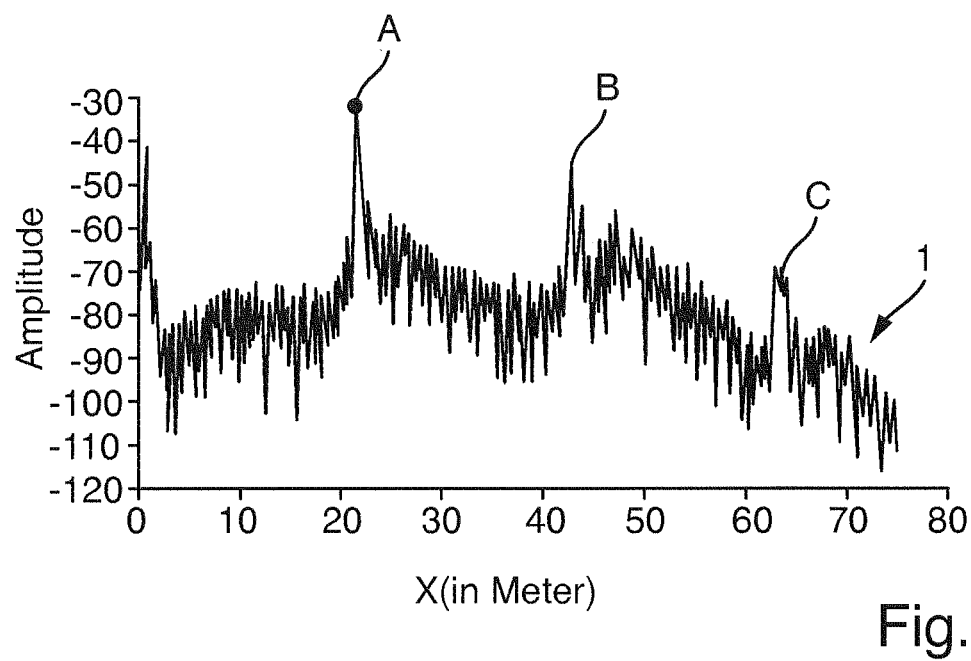
FIG. 1: is a graphic representation of an echo function of an FMCW radar measuring device.

FIG. 1 shows a graphic representation of an echo function 1 of an FMCW radar measuring device, wherein the echo function 1 represents the echo amplitudes as a function of the distance X. A digitized intermediate frequency signal IF serves as a starting point for depicting the echo function 1. The digitized intermediate frequency signal IF is a real-valued signal within the time range. An echo function 1 is formed by deriving the received signal amplitude from the intermediate frequency signal IF and depicted as a function of time or distance X.

To form the echo function 1, first, a direct component of the digitized intermediate frequency signal IF is eliminated. The different frequency components contained in the intermediate frequency signal IF are retained.

A Hilbert transformation can be performed as the next step, in which the imaginary part belonging to the real-valued intermediate frequency signal IF is calculated. As the result of the Hilbert transformation, a complete, complex-valued intermediate frequency signal IF within the time range is obtained. This complex-valued signal then serves as a basis for the further processing of the signal.

Subsequently, a device-specific correction curve can be applied to the complex-valued signal. With the assistance of this device-specific correction curve, the specific characteristics of the radar measuring device can be taken into account that are caused, inter alia, by the HF module, the mode converter, and the antenna, as well as the HF cable, connecting elements, and/or plug-in connectors.

Subsequently, a fast Fourier transform (FFT) is carried out. The frequency spectrum of the intermediate frequency signal IF is obtained as a result of the fast Fourier transform. Subsequently, the echo frequency component contained in this frequency spectrum is detected. In the process, each frequency peak A, B, C in the frequency spectrum is assigned an object. Of particular interest in fill-level measurement is the frequency peak A of the useful echo that is produced by the reflection of the radar signals from the surface of the liquid or medium. This relevant frequency peak A of the useful echo, which is relevant for measuring the fill level, can be identified by means of a search algorithm. A person skilled in the art is aware of many such search algorithms. The actual phase position is determined as a phase position at the position of the frequency peak A as a result of the Fourier transform.

Alternatively, a digital bandpass filter can be defined for determining the phase position, which is configured to filter out from the frequency spectrum the frequency peak produced by the surface of the medium, and to suppress other interfering frequency peaks. To accomplish this, the lower limit frequency and the upper limit frequency of the bandpass filter are set so that the frequency peak caused by the surface of the medium lies within the passband of the bandpass filter. Interfering frequency components that lie below the lower limit frequency, or above the upper limit frequency, of the bandpass filter are filtered out. As a result of bandpass filtering, a frequency spectrum is obtained that basically contains a single frequency peak, i.e., frequency peak A, which is relevant to measuring the fill level and is produced by reflection from the surface of the medium.

This bandpass-filtered frequency spectrum is then transformed back into the time domain by means of an inverse Fourier transform. For example, an inverse fast Fourier transform (IFFT) can be carried out. As a result of the inverse fast Fourier transform, a complex-valued time signal is obtained that basically contains a single frequency component, i.e., the frequency component that arose from the reflection of the radar signal from the surface of the medium. The actual phase position can then be ascertained directly from this time signal, and a determination of the measuring distance can be performed.

Figure 2:
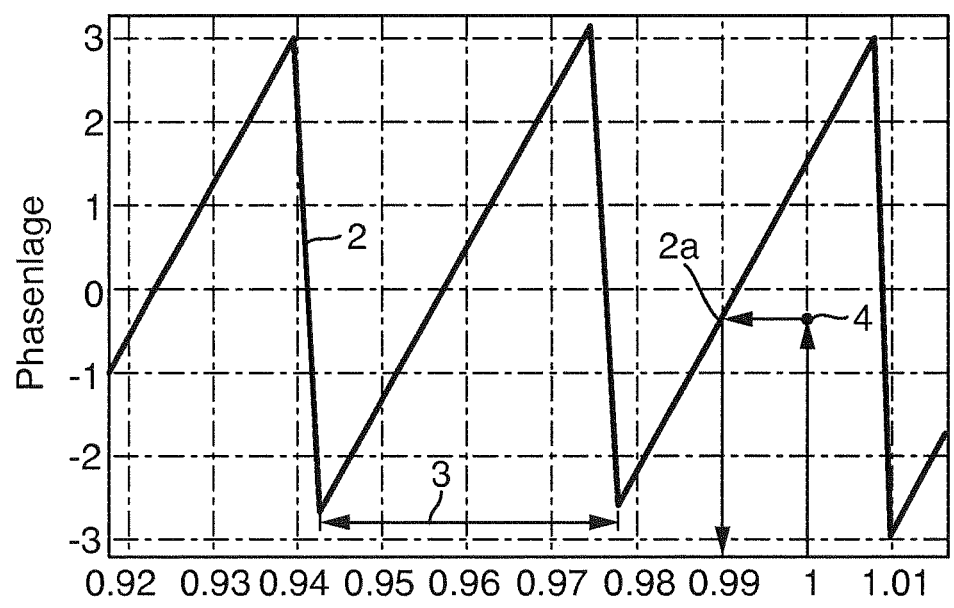
FIG. 2: is a graphic representation of a target phase progression of a measurement signal as a function of the distance.

FIG. 2 shows a graphic representation of a target phase progression 2 of a measurement signal as a function of the distance X. When the aforementioned correction curve is being generated, a target phase progression 2 of the measurement signal at distance X can be ascertained. To ascertain or generate the device-specific correction curve, a reference measurement for an object with a known distance is performed, and the device-specific phase position at the known distance is derived from this reference measurement. The phase position can be derived from this time signal at any point in time for the known distance. A second reference measurement can be performed for a second known distance, in order to increase the reliability of the ascertainment of the target phase progression 2.

Accordingly, a device-specific target phase progression 2 can be created. The target phase progression 2 as shown in FIG. 2 has a sawtooth shape, wherein the target phase position grows linearly for each phase period 3, or for each wavelength.

In measuring mode, an unknown distance is precisely ascertained by means of this target phase progression 2. In determining the distance, a rough determination 4 is performed using the position of the frequency peak A of the useful echo in the echo function 1 as depicted in FIG. 1. Then, the actual phase position of this frequency peak A is ascertained. In FIG. 2, a point resulting from such a determination is identified with reference number 4. The measured value is corrected so that the ascertained phase position 4, or the actual phase position 4, corresponds with the target phase position 2a. The measured value is accordingly shifted within a distance range that is defined by the phase period determined by the rough determination of distance.

Figure 3:
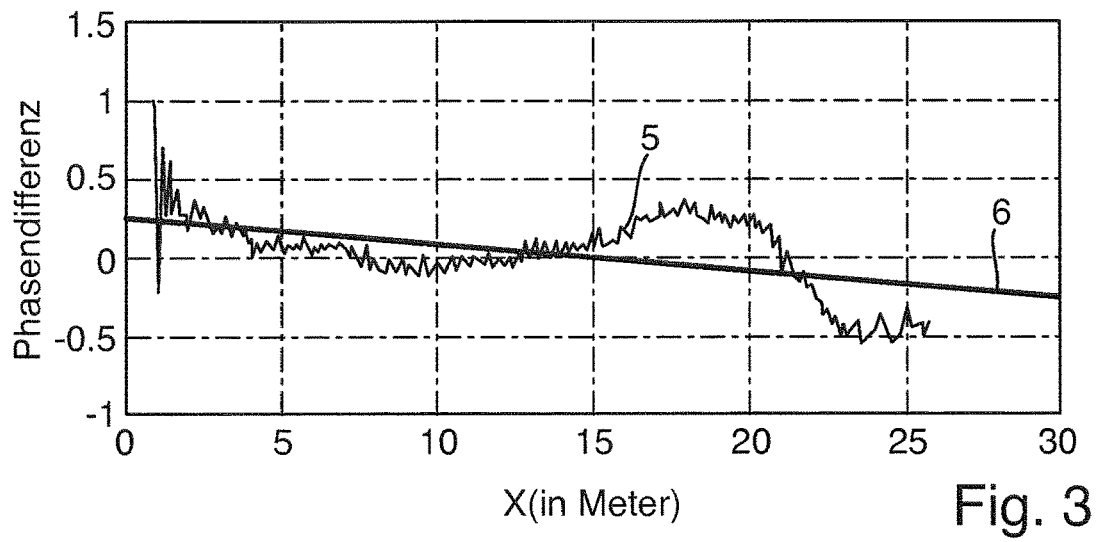
FIG. 3: is a first phase difference progression to which a linear function was adapted.

FIG. 3 shows a first phase difference progression 5, to which a linear function 6 has been adapted. The progression of the phase difference 5 is not influenced in this context by a systematic error; accordingly, the difference between the actual phase position 4 and the target phase position 2a is basically less than +/−0.5π over the entire measuring path X (about 27 m in this context). The adapted line has a slope that is approximately (0.5*π)/30, and the axial offset is approximately 0.25 radian. Because the phase difference 5 is always less than +/−π, the last phase period can always be clearly identified. There is, therefore, no reason to expect a phase jump in the measurement signal evaluation. A phase jump can occur only when the difference between the actual phase position and the target phase position is approximately +/−π. Only then is it no longer possible to clearly identify the last phase period.

The phase difference progression 5 depicted in FIG. 3 is from a calibrated radar measuring device. Accordingly, a reference measurement was performed as described above, so that the target phase position and actual phase position substantially correspond. The axial offset and the slope of the adapted linear function accordingly lie within the predefined value ranges W1, W2.

Figure 4A:
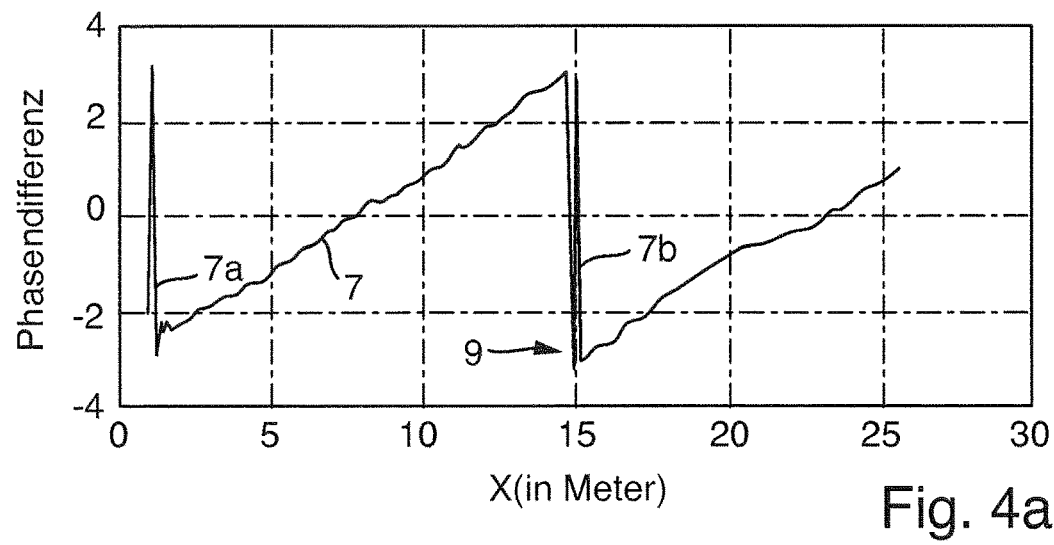
FIG. 4a: is a second phase difference progression for an FMCW radar measuring device that has a systematic error, and thus phase jumps.

If this radar measuring device is used with another surge pipe, this correspondence no longer exists. FIG. 4a shows a phase difference progression 7 as an example of this. FIG. 4a shows a second phase difference progression 7 for an FMCW radar measuring device that has a systematic error, and thus phase jumps.

The systematic error in this case is, for example, an incorrectly indicated surge pipe diameter. The phase difference 7 rises linearly at a measuring distance X between about 2 and 15 m from the radar measuring device. The phase difference 7 changes over this measuring is distance X by 2*π radian. At about 15 m, the phase difference 7 is accordingly about +1*π, and the difference between target phase position 2a and actual phase position 4 jumps between +1*π and −1*π. Here, the actual phase position is 4π radian distant from a target phase position 2a in a first phase period, and π radian distant from the target phase position in a second phase period. Accordingly, there is an ambiguity as to which target phase position of the two target phase positions in the first and second phase periods should be assigned the actual phase position 4.

This ambiguity is eliminated by means of the, in particular, linear functional relationship 6. A line 6 is accordingly adapted to the phase difference progression 7, wherein this line, or this linear functional relationship 6, is ascertained while determining the phase difference progression 7. The slope and axial offset of the line are ascertained and compared to set criteria, in order to ensure that the actual phase position 4 is always assigned to a target phase position 2a that lies within a single phase period. This is explained in greater detail in conjunction with FIG. 4b.

Figure 4B:
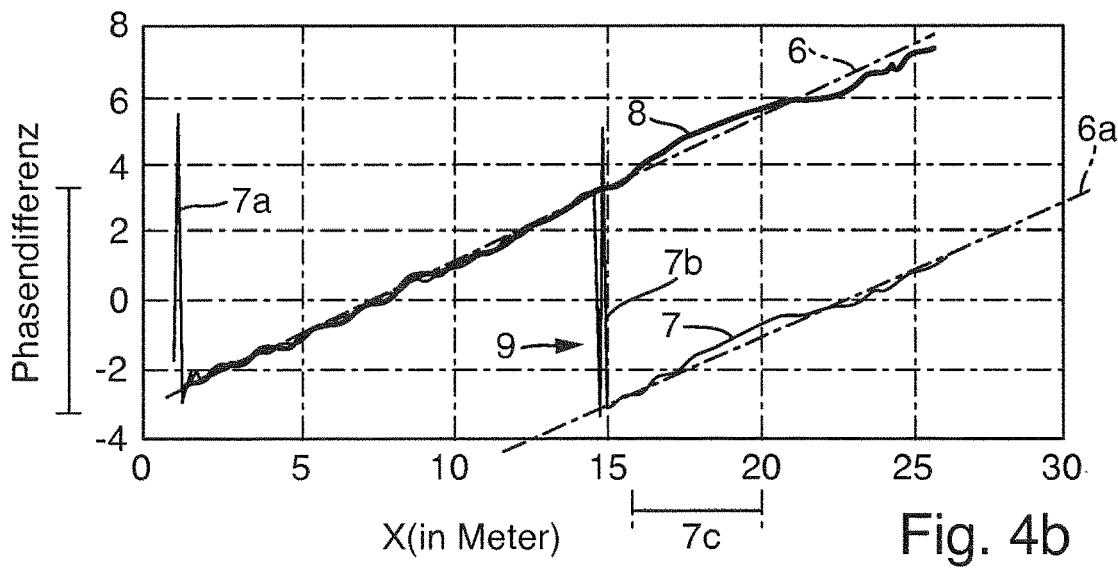
FIG. 4b: is a corrected phase difference progression, wherein the phase jumps of the phase difference progression shown in FIG. 4a have been eliminated.

FIG. 4b shows a corrected phase difference progression 8, wherein the phase jump 9 of the phase difference progression 7 shown in FIG. 4a is eliminated. The phase difference progression 8 is approximated in FIG. 4b with the assistance of a linear regression. During the measuring mode of the radar measuring device, at least five numerical values are ascertained and updated. The at least five numerical values are, for example:

1) the average measuring distance of the frequency peak of the useful echo, which captures the measuring distance X from the runtime information of the measurement signal, 2) the average phase difference 5 between the actual phase position 4 at frequency peak A of the useful echo and the target phase position 2a, 3) the average value of the square of the measuring distance X, 4) the average value of the product of the measuring distance X and the phase difference 5, and 5) a number n of learning points.

The number of learning points is the number of measuring distances X that are used to adapt the linear functional relationship 6 to the phase difference progression 5, 7. This number n starts at zero and is incremented by one with each new learning point until a set limit value $n_{max}$ is reached.

During measuring mode, these numerical values are ascertained and saved in a memory unit of the radar measuring device. An arithmetic unit of the radar measuring device can use these numerical values for determining the slope and the axial offset of the line 6 to be adapted by means of the following formulas:

$$Slope_n = \frac{\overline{Measuring\ distance * Phase\ difference_n} - \overline{Measuring\ distance_n} * \overline{Phase\ difference_n}}{\overline{Measuring\ distance_n^2} - (\overline{Measuring\ distance_n})^2}$$

$$Axial\ offset_n = \overline{Phase\ difference_n} - Slope_n * \overline{Measuring\ distance_n}$$

wherein the numerical values can be updated while ascertaining learning points, i.e., new measuring distances X and phase differences 5, 7, using the following formulas:

$$n = \begin{cases} n+1, & \text{if } n < n_{max} \\ n, & \text{if } n = n_{max} \end{cases}$$

$$\overline{Measuring\ distance_n} = \frac{n-1}{n} * \overline{Measuring\ distance_{n-1}} + \frac{1}{n} * Measuring\ distance$$

$$\overline{Phase\ difference_n} = \frac{n-1}{n} * \overline{Phase\ difference_{n-1}} + \frac{1}{n} * Phase\ difference$$

$$\overline{Measuring\ distance_n^2} = \frac{n-1}{n} * \overline{Measuring\ distance_{n-1}^2} + \frac{1}{n} * Measuring\ distance * Measuring\ distance$$

$$\overline{Measuring\ distance * Phase\ difference_n} = \frac{n-1}{n} * \overline{Measuring\ distance * Phase\ difference_{n-1}} + \frac{1}{n} * Measuring\ distance * Phase\ difference$$

The linear functional relationship 6 is accordingly adapted to the phase difference progression 5, 7. During this dynamic adaptation, the slope and axial offset of the adapted line vary correspondingly. By specifying a first value range W1 for the slope and a second value range W2 for the axial offset, the arithmetic unit can check the adaptation after each update. It is accordingly determined whether the actual phase position 4 can be clearly assigned a target phase position 2a of the target phase progression 2.

For example, the first value range W1 can be so specified for the slope that first ascertained phase difference values 7a, which are shown in FIG. 4a, b, are excluded for adapting the line. The first phase difference values 7a, which are at about 2 m in FIG. 4a, b, jump between +π and −π. A line that is adapted to these phase difference values 7a has a very steep slope. The first value range W1 can be set so that this steep slope is excluded.

In FIG. 4b, the jumping phase difference values 7b, which are at about 15 m, are also excluded. The second value range W2 for the axial offset generally spans phase difference values between +/−π. In updating the numerical values for learning points N that correspond to the measuring distance range, for example, between 16 to 20 m, a linear functional relationship 6 is ascertained that has a slope which falls within the first value range W1. However, the axial offset of the line lies outside of the second value range W2+/−π. Accordingly, the arithmetic unit of the radar measuring device recognizes that a phase jump 9 has occurred. The phase difference values 7c in this measuring distance range are shifted upwards in this case by an addition of 2*π. The corrected phase difference progression 8 is created in this manner.

Figure 5:
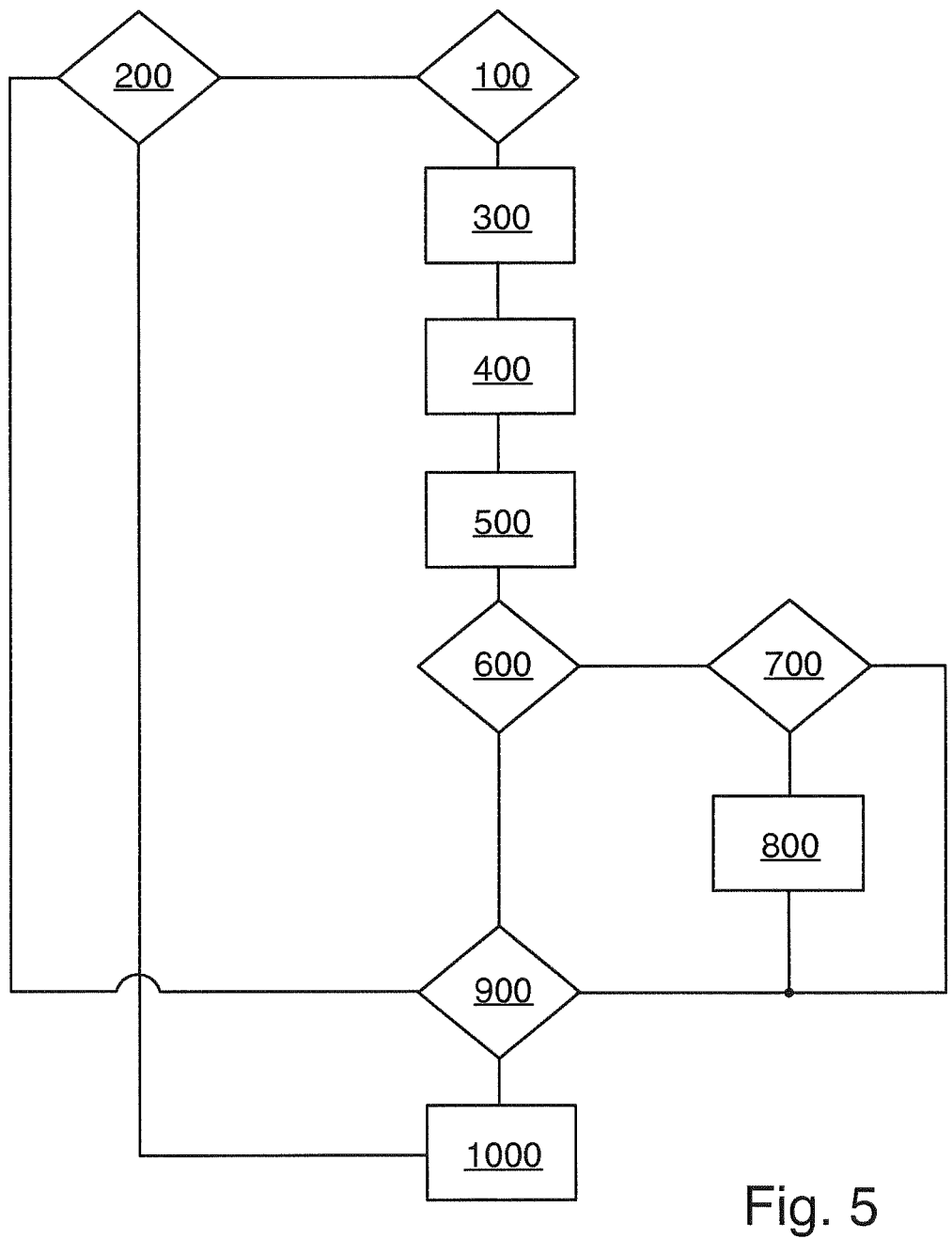
FIG. 5: is an exemplary method flow, particularly for the instance in which the linear functional relationship is adapted to the phase difference progression.

FIG. 5 shows an exemplary method flow—in particular, for the instance in which the linear functional relationship 6 is adapted to the phase difference progression 7. When the method enters step 100, a check is performed as to whether or not the numerical values calculated according to the above formulas are present. If there are no numerical values, e.g., when the radar measuring device is first turned on, the numerical values are initialized with the current measured values in step 200 as follows:

$$n = 1$$

$$\overline{\text{Measuring distance}_1} = \text{Measuring distance}$$

$$\overline{\text{Phase difference}_1} = \text{Phase difference}$$

$$\overline{\text{Measuring distance}_1^2} = \text{Measuring distance} * \text{Measuring distance}$$

$$\overline{\text{Measuring distance} * \text{Phase difference}_1} = \text{Measuring distance} * \text{Phase difference}$$

The line 6 runs flat through the first measuring point. The flat line 6 has a slope equal to zero. The phase jump is excluded at the first measuring point; consequently, a correction of the phase difference value is also unnecessary.

If numerical values already exist, the line 6, after step 100, is calculated in step 300 according to the above formulas, and the phase difference is immediately shifted from the line 6 to the value range W2+/− *π by adding +/−2*π.

Then, the number n of learning points can be limited in step 400 by specifying a limit value $n_{max}$. Upon reaching the limit value $n_{max}$ (i.e.: $n=n_{max}$), the number n of learning points is then no longer incremented or increased stepwise with each new learning point. This ensures that the new learning points are still taken into consideration with a minimum weight of $1/n_{max}$ even during a lengthy measurement operation. This ensures that the line 6 is continuously adapted to the current numerical values. The adaptation of the line 6 is accordingly sensitive to newly ascertained learning points, as well as dynamically updatable.

The numerical values or learning points are then updated in step 500, and the line 6 is updated or calculated with the added learning points. Then, the standard deviation of the average measuring distance X is evaluated in step 600 and compared with the specified limit values.

If the standard deviation of the average measuring distance X exceeds the specified limit values, the axial offset of the line 6 is checked in step 700. If the maximum amount of the axial offset of the line 6a is greater than π, or perhaps π plus a tolerance value, the axial offset is brought in step 800 to the value range W2 between +/−π by adding +/−2*π to the axial offset of the line 6a. In so doing, the numerical values or learning data must be correspondingly adapted in the memory unit of the radar measuring device.

If the standard deviation of the measuring distance does not exceed the specified limit value, or if the axial offset is less than π, or perhaps π plus a tolerance value, the slope of line 6 is investigated in step 900. If the slope lies outside of the first specified value range W1, the numerical values are re-initialized according to step 200 and inserted into a flat line 6 as a first learning point. If the slope in step 900 is within the first value range W1, or if the slope is not excessively large, +/−2*π is, in step 1000, added in turn to the phase difference until it lies between +/−π of the line 6 in the value range W2. A reliable phase difference value 8 that is without the phase jumps can accordingly be provided, to increase the precision of the radar measuring device.

The invention claimed is:

1. A method for determining a distance value that is captured by a radar-based distance measuring device, comprising the steps of:
    emitting with the measuring device a radar-based transmission signal and receiving a component of the transmission signal that is reflected by an object as a reflected signal;
    making a rough determination of the distance using the position of a frequency peak of the reflected signal by an electronics unit of the measuring device;
    determining a first phase difference between a first target phase position and a first actual phase position contained in the reflected signal by the electronics unit;
    determining the first phase difference at a first distance of the object, wherein the first target phase position is calculated for this first distance;
    ascertaining the first actual phase difference at this first distance;
    determining a second phase difference between a second target phase position and a second actual phase position contained in the reflected signal;
    determining the second phase difference at a second distance of the object, and calculating the second target phase position for this second distance;
    ascertaining the second actual phase position at this second distance;
    ascertaining a phase difference progression in the form of a functional relationship on the basis of the first and the second phase differences by the electronics unit; and
    determining a distance value by means of the rough distance and the functional relationship by the electronics unit.

2. The method according to claim 1, wherein:
    the functional relationship is ascertained as a function of a distance of the object to be determined from the reflected signal.

3. The method according to claim 1, wherein:
    the functional relationship is used to avoid a phase jump when determining the measured value.

4. The method according to claim 3, further comprising the step of:

using a parameter of the phase difference progression—especially, a slope and/or an axial offset of the, in particular, linear functional relationship to recognize and/or eliminate a phase jump of the measured value.

5. The method according to claim 1, wherein the measuring device is a radar measuring device, and the method further comprises the steps of:
converting the received signal into a digital reflected signal, especially by means of a scanning method; and
determining the distance of the object with runtime information contained in the reflected signal, in order to ascertain the functional relationship.

6. The method according to claim 1, wherein:
the functional relationship is ascertained with the assistance of a linear regression.

7. The method according to claim 1, wherein:
the functional relationship is updated iteratively with additionally ascertained phase differences.

8. The method according to claim 1, wherein:
the first target phase position and/or the second target phase position are/is ascertained with a target phase progression;
that the target phase progression is ascertained by means of a calibration; and
that the calibration is carried out by means of at least one known distance.

9. A measuring device that serves to determine a distance value, wherein the measuring device serves to emit a transmission signal, and receiving a component of the transmission signal reflected by an object as a reflected signal, comprising:
an electronics unit, wherein:
said electronics unit serves to determine a rough distance using the position of a frequency peak of the reflected signal;
said electronics unit serves to determine a first phase difference between a first target phase position and a first actual phase position contained in the reflected signal, to determine the first phase difference at a first distance of the object, wherein the first target phase position is calculated for this first distance, and to ascertain the first actual phase difference at this first distance;
said electronics unit serves to determine a second phase difference between a second target phase position and a second actual phase position contained in the reflected signal, to determine the second phase difference at a second distance of the object, to calculate the second target phase position for this second distance and to ascertain the second actual phase position at this second distance; and
said electronics unit serves to ascertain a phase difference progression in the form of an, in particular, linear, functional relationship on the basis of the first and the second phase differences, thereby determining the distance value by means of the rough distance and the functional relationship.

10. The measuring device according to claim 9, wherein:
the measuring device is a fill-level measuring device.

* * * * *